(12) United States Patent
Burks et al.

(10) Patent No.: US 10,982,399 B1
(45) Date of Patent: Apr. 20, 2021

(54) CABLE BARRIER SYSTEM FOR USE WITH CABLE BARRIER MANAGEMENT SYSTEM INCLUDING TURNBUCKLE SUBSYSTEM, AND METHOD

(71) Applicant: EBJM Industries, LLC, Memphis, TN (US)

(72) Inventors: Brian W. Burks, Memphis, TN (US); Murray B. Wells, Memphis, TN (US)

(73) Assignee: EBJM Industries, LLC, Memphis, TN (US)

( * ) Notice: Subject to any disclaimer, the term of this patent is extended or adjusted under 35 U.S.C. 154(b) by 0 days.

(21) Appl. No.: 16/850,660

(22) Filed: Apr. 16, 2020

(51) Int. Cl.
| | |
|---|---|
| *E01F 15/06* | (2006.01) |
| *G01L 5/103* | (2020.01) |
| *H04W 84/18* | (2009.01) |
| *G01S 19/42* | (2010.01) |
| *G01L 1/04* | (2006.01) |
| *G01B 7/16* | (2006.01) |
| *A01K 3/00* | (2006.01) |

(52) U.S. Cl.
CPC ............. *E01F 15/06* (2013.01); *G01B 7/18* (2013.01); *G01L 5/103* (2013.01); *A01K 3/005* (2013.01); *G01L 1/04* (2013.01); *G01S 19/42* (2013.01); *H04W 84/18* (2013.01)

(58) Field of Classification Search
CPC .......... E04H 17/02; E04H 17/04; E01F 15/02; E01F 15/04; E01F 15/065; E01F 15/06; F16G 11/12; G01B 7/18; G01S 19/42; H04W 84/18; G01L 1/04; G01L 5/103
See application file for complete search history.

(56) References Cited

U.S. PATENT DOCUMENTS

| | | | |
|---|---|---|---|
| 5,852,402 A | * | 12/1998 | Perry ................... G08B 13/122 340/541 |
| 6,533,502 B2 | | 3/2003 | McVay et al. |
| 6,543,296 B1 | | 4/2003 | Bermudez |
| 7,719,416 B2 | | 5/2010 | Arms et al. |

(Continued)

FOREIGN PATENT DOCUMENTS

| | | | |
|---|---|---|---|
| CN | 105569059 A | * | 5/2016 |
| CN | 105955163 A | * | 9/2016 |

(Continued)

*Primary Examiner* — Jonathan M Dunlap
(74) *Attorney, Agent, or Firm* — Hunt Pennington Kumar & Dula pllc

(57) ABSTRACT

A cable barrier system is managed by a cable barrier management system including a management system controller having a management processor, a wireless data communications interface, and a plurality of turnbuckle subsystems configured to be joined to respective barrier cables to provide pretension. Each of the turnbuckle subsystems has a strain gauge mounting zone and is configured to enable communication of strain from a strain gauge circuit to the management processor. The management system controller includes a sensing circuit to receive the strain gauge output voltage from the strain gauge circuit and provide sensing circuit output to the management processor. The management system controller includes a cable barrier analysis module configured to determine excess strain events. The management processor generates strain event data, which is sent via the wireless data communications interface to a remote recipient computing device.

16 Claims, 10 Drawing Sheets

(56) References Cited

U.S. PATENT DOCUMENTS

| | | | |
|---|---|---|---|
| 7,975,554 B2 | 7/2011 | Berkcan et al. | |
| 8,833,176 B1 | 9/2014 | Shapiro et al. | |
| 2007/0007500 A1* | 1/2007 | Neusch | E04H 17/04 |
| | | | 256/13.1 |
| 2013/0069026 A1 | 3/2013 | Bergendahl et al. | |
| 2019/0338831 A1* | 11/2019 | Squires | B60P 7/0838 |

FOREIGN PATENT DOCUMENTS

| | | | |
|---|---|---|---|
| GB | 2228093 A * | 8/1990 | ............... F16B 7/06 |
| JP | WO 2012/169534 A1 | 12/2012 | |
| JP | 5725982 B2 * | 5/2015 | ............. F16G 11/12 |
| NL | WO 2005/075286 A1 | 8/2005 | |
| WO | WO-9429689 A1 * | 12/1994 | .......... G01M 5/0066 |
| WO | WO-2009124054 A1 * | 10/2009 | |
| WO | WO-2016067176 A1 * | 5/2016 | ........... G08B 13/122 |

\* cited by examiner

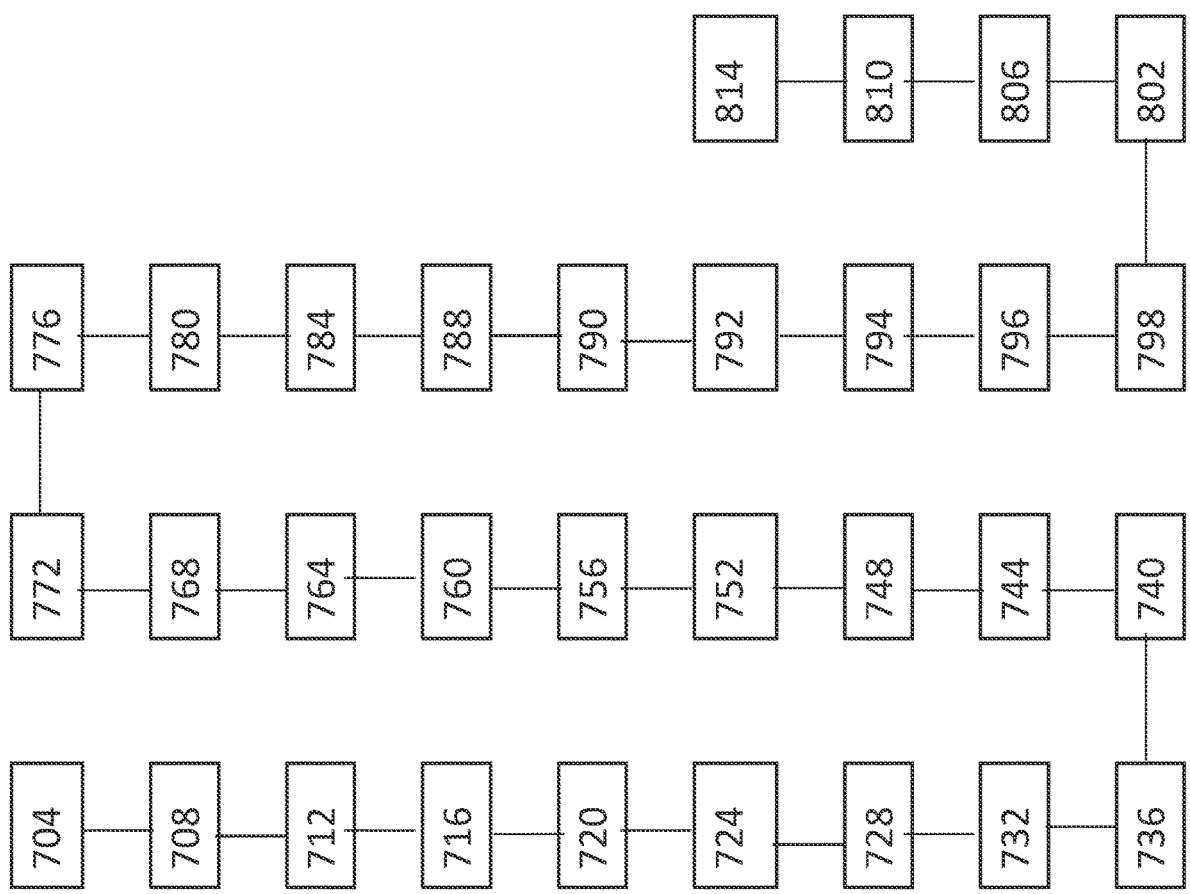

CABLE BARRIER SYSTEM FOR USE WITH CABLE BARRIER MANAGEMENT SYSTEM INCLUDING TURNBUCKLE SUBSYSTEM, AND METHOD

FIELD OF THE INVENTION

The present disclosure relates to tensioned cable barrier systems (CBS) for roadways.

BACKGROUND OF THE INVENTION

Cable barrier systems (CBS), such as wire rope fence systems (WRFS) or wire fence systems (WFS) (collectively, cable barrier systems (CBS)), may serve as permanent longitudinal safety barriers along stretches of roadways. A cable barrier system may be installed adjacent a stretch of roadway to prevent vehicles deviating off the roadway surface, from reaching a roadside hazard such as an opposite direction travel lane of a divided highway, obstacle, slope, or precipice. In one common application, a cable barrier system may be located in the median along a stretch of a divided highway, to stop vehicles veering from the roadway from crossing the median into the opposite direction lane of travel. Cable barrier systems of the general type that are the subject of this disclosure are available from suppliers such as Trinity Industries (Dallas, Tex.) Nucor (Charlotte, N.C.), Brifen USA (Oklahoma City, Okla.), and Gibraltar Global (Burnet, Tex.). The Transportation Research Board (TRB) National Cooperative Highway Research Program (NCHRP) Report 711: Guidance for the Selection, Use and Maintenance of Cable Barrier Systems (including Appendices A-D), Transportation Research Board (2012), ISBN 978-0-309-25842-5, is hereby incorporated by reference in entirety. The CASS TL-3 & TL-4 Systems Assembly Manual (Trinity Highway Products, Dallas, Tex.) (Trinity Part No. 620038B)(September 2012) is hereby incorporated by reference in entirety.

A cable barrier system may include a set of pretensioned cables extending in the horizontal direction between a plurality of spaced vertical support posts. Although the number of cables may vary, a typical cable barrier system may include three (3) or four (4) tensioned cables. The cables may be formed of wire rope. The mounting posts may be set in concrete footings or in the earth adjacent the stretch of roadway. In order to function properly, the cables may be installed with a pretension. The pretension may be selected to minimize dynamic deflection of the cables upon vehicle impact and thus maximize vehicle capture by the cable barrier system. The cable barrier system may include hardware such as anchors, cable splices, and turnbuckles, which support the cables relative to the posts and ground. Turnbuckles, for example, may be installed between opposite ends of cable segments running end to end, to connect the cable segments. The turnbuckles can be adjusted to create a desired amount of pretension the cables. Factors such as installation temperature and cable pre-stretch may be important factors for proper functioning of a cable barrier system. The pretensioned cables may be damaged by vehicle to barrier collisions with the cable barrier system. Depending upon the extent of damage to the cables, reinstallation, renewing the pretension, or replacement of the cables may be undertaken. The cables may lose tension due to factors such as, for example, thermal expansion, fatigue and aging, and thus require periodic maintenance.

BRIEF DESCRIPTION OF THE INVENTION

In an embodiment, a cable barrier system (CBS) may include a plurality of support posts installed in the ground and spaced along a stretch of roadway, and a plurality of cables running between the support posts and secured in place with mounting hardware. The cables may extend generally parallel to the ground in a horizontal orientation. The cables when installed may be pretensioned to minimize dynamic deflection and capture or arrest a vehicle moving relative to the cable barrier system.

The cable barrier system may be configured for use and operable with a cable barrier management system. The cable barrier management system may include a plurality of turnbuckle subsystems each joined to respective of the plurality of cables and configured to receive and support a strain gauge circuit and management system controller in electrical communication with the strain gauge circuit. Each of the turnbuckle subsystems may be joined between opposed ends of adjacent cable segments running in end-to-end relationship, to draw together the opposed ends of the adjacent cable segments. In some configurations, the cable segments may include a threaded transition section, such as a threaded rod, to be joined in mating threaded engagement with the turnbuckle subsystem. Each of the turnbuckle subsystems may include a turnbuckle body assembly joined with and drawing together opposed ends of adjacent cable segments. The turnbuckle body assembly may include a turnbuckle body having threaded ends that enable adjustments between mating threads of the turnbuckle body and adjacent cable segment. The turnbuckle body assembly may include a strain gauge mounting zone. The strain gauge mounting zone may include a flat surface formed in the turnbuckle body, which extends in parallel relationship to the longitudinal axis of the turnbuckle body assembly to enable mounting the strain gauge circuit in an orientation to receive strain from forces exerted on the turnbuckle body assembly from the pretensioned cables. The turnbuckle body assembly may include a system controller mounting zone. The system controller mounting zone may include an extended portion of the flat surface formed in the first turnbuckle body or second turnbuckle body, which enables mounting and support of the management system controller in electric circuit communication with the strain gauge circuit to receive strain gauge output voltage from the strain gauge circuit in relation to forces received by the strain gauge circuit from the turnbuckle body assembly. The turnbuckle body may include a depression formed in the body, such as by machining, with the flat surface defining the bottom of the depression. The depression may include a pair of opposed, parallel minor end walls each extending perpendicular to the major longitudinal axis of the turnbuckle body assembly, between a corresponding edge of the flat surface and along a curved outer edge formed along an intersection with the major outside surface of the turnbuckle body. The depression may have an open volume between the pair of minor end walls and flat surface forming the bottom.

In an embodiment, the cable barrier management system may include a strain gauge circuit mounted to the turnbuckle body assembly at the strain gauge mounting zone, or flat area, to receive strain from the turnbuckle body assembly in relation to strain generated in the turnbuckle body assembly under loads exerted by the pretensioned cables. The management system controller may include a sensing circuit in communication with the strain gauge circuit to pass voltage in relation to strain received by the strain gauge circuit. In an embodiment, the sensing circuit may include a transducer interface configured to produce transducer output voltage, in relation to strain received by the strain gauge circuit. The management system controller may include a management processor configured to receive the transducer output voltage in relation to strain received by the strain gauge circuit. The management processor may be configured to determine, by receiving the transducer output voltage, a level of strain received by the strain gauge circuit in relation to a threshold level. In an embodiment, the sensing circuit may be configured to operate in a low power mode, wherein the strain gauge circuit is periodically quantified by the management processor in communication with the sensing circuit and receiving the transducer output in relation to strain received by the strain gauge circuit, and wherein the management processor may send periodic communications of cable barrier management system status information via a wireless communication interface, with the periodic communications being limited to conserve energy. In an embodiment, the sensing circuit may be configured to operate in an ultra-low power mode, wherein the strain gauge circuit output is monitored and compared to an actuation level that triggers the management processor to wake and operate in the low power mode or in an active, high power mode, and may eliminate monitoring and filtering of the strain gauge circuit output by the processor.

In an embodiment, the management processor may be configured to determine collision events by monitoring strain gauge circuit output in relation to strain received by the strain gauge circuit. In an embodiment, the management processor may be configured to determine collision events such as by determining or identifying vehicle to barrier collision events in which a vehicle has collided with the barrier system that is configured for use and operable with the cable barrier management system. When a vehicle to barrier collision event occurs between a vehicle and the barrier system, an impulse of extraordinary strain will be imparted to and received by the cable barrier management system, such that the strain gauge circuit output will include a strain event that may include extraordinary strain such as a large change in the strain gauge circuit output, rapid change in the strain gauge circuit output, or both. As used here, "extraordinary strain" means strain produced by a vehicle to barrier strain event and received by the strain gauge circuit, that exceeds the range of strain received by the cable barrier management system in regular functioning of the barrier system without a vehicle to barrier collision event. In an embodiment, the strain gauge circuit output may be an electrical signal output in relation to a transducer converting strain force to electric voltage output. Strain gauge circuit output may be monitored by the management processor. In an embodiment, when the management processor determines that a strain event has occurred, either the processor or a microcontroller including the processor, may exit the low power mode and perform additional processing of strain gauge circuit output, which may include receiving and processing additional measurements of strain gauge circuit output. This additional processing of strain gauge circuit output by the management processor may improve precision of measurements of actual strain received by the strain gauge circuit. Additional processing of strain gauge circuit output also may improve accuracy of analytical processing or analysis of the strain gauge circuit output in determining whether a strain event detected or identified in the strain gauge circuit output is caused by a vehicle to barrier collision event. If the detected strain event is a vehicle to barrier collision event, the management processor may output a notification message and cause the same to be transmitted to a remote receiving unit via the wireless communications interface over a wireless data communication channel, such as a radio frequency (RF) subsystem. The notification message when transmitted will be received by the receiving units remote from the cable barrier management system. In an embodiment, the management processor and wireless communications interface may be configured to transmit and/or re-transmit information relating to the status of the cable barrier management system, barrier system, or both, at an increased rate of communications. In an embodiment, the management processor may be configured to provide a historical event status message, subsequent to the strain event, indicating that a vehicle to barrier collision event has occurred in a history of the cable barrier management system and barrier system.

In an embodiment, the cable barrier management system may include a power supply system. The management processor may be configured to manage the power supply system. The power supply system may be configured to supply electric power to circuit elements of the cable barrier management system. The power supply system also may be configured to develop the electric power supplied to the circuit elements, such as by operation of a solar or photovoltaic (PV) element. The power supply system may include a rechargeable battery configured to be charged by operation of the photovoltaic element. The power supply system may include a battery management subsystem configured to monitor and manage charging of the rechargeable battery in relation to instructions received from the management processor.

The management processor may be configured for communication with storage, which in an embodiment may be non-volatile storage, to write cable barrier management system data into the storage. The management processor may be configured to cause operation of indicator electronics which may present a visual indication of status of the barrier system. The management processor may be configured to output GPS data for the cable barrier management system. In an embodiment, the management processor may be configured to receive and output environmental sensor data such as, for example, atmospheric relative humidity, pressure and temperature data for the cable barrier management system.

In an embodiment, the cable barrier management system may include a communications interface configured to implement wireless communications according to a communications protocol. The wireless communications interface may be enabled and operate responsive to and under control of the management processor. In an embodiment, such a wireless communications interface may be a radio frequency (RF) communications interface configured for communicating data over a wireless communications channel according to a suitable data communications protocol, to a recipient computing device, such as a wireless recipient computing device, remote from the cable barrier management system. Such a wireless communications channel may be, for example, a channel of a cellular network or other mobile device communications network. In an embodiment, the cable barrier management system may monitor the functional status or health of a cable barrier system. If the cable barrier system does not meet minimum tension requirements for operation, the cable barrier management system may output an automatic notice message to a remote recipient computing device of a designated monitoring authority. Maintenance of the cable barrier system may be scheduled, dispatched and performed in relation to such automatic notice messages.

In an embodiment, the management processor of the cable barrier management system may be configured to detect, transmit and provide monitoring information to a remote recipient computing device, where damage to the cable barrier system has occurred, such as by a vehicle to barrier impact event. Impact events may include, for example, high energy impact events such as a vehicle directly striking a turnbuckle subsystem in a manner that damages or destroys the portions, such as circuits, of the cable barrier management system located at the turnbuckle subsystem. Impact events also may include low energy impact events, such as incidental passing contact with a vehicle that veers off and then back on to the roadway or with highway maintenance equipment passing by in the right of way. In an embodiment, where a strain event is detected, the management processor may output a status update message including a preliminary flag, and may cause the same to be transmitted via the wireless interface, with only partial or incomplete filtering or processing of the strain event data. The preliminary flag, when received by the remote recipient computing device, is recorded. Where a preliminary flag is recorded, the management processor may determine whether subsequent communications are received from the same cable barrier management system. The management processor of the cable barrier management system may query and perform a status check of the cable barrier system. In an embodiment, the cable barrier management system may be configured for the management processor to enter a high-power state where processing occurs at a higher rate and attempts to determine if a vehicle to barrier collision event has occurred, without unnecessary delay. The management processor may be configured to output and transmit an impact message to a remote recipient computing device before damage to the cable barrier management system prevents such output and transmission of the impact message. In an embodiment, the cable barrier management system may be configured to determine the destruction or other non-functioning status of portions of the cable barrier management system, such as portions located at or in proximity to the turnbuckle subsystem, by detecting or determining where periodic status messages are absent and not received by a remote recipient computing device.

In an embodiment, the cable barrier management system may be configured to enable unique identification of a turnbuckle subsystem, and location of same, in relation to specific configuration information relating to a portion of the cable barrier management system located at or in immediate proximity to the turnbuckle subsystem with minimal consumption of power for GPS electronics.

In an embodiment, a method for managing a cable barrier system is provided. The method for managing a cable barrier system may include providing a cable barrier management system. The method may include configuring the cable barrier management system to include a turnbuckle subsystem joined to a cable for adjusting and exerting a pretension force on the cable. The method may include configuring the turnbuckle subsystem to include a turnbuckle body assembly joined to the cable for adjusting and exerting pretension force on the cable. The method may include configuring the turnbuckle body assembly at a strain gauge mounting zone to support a strain gauge circuit, and to output strain from the turnbuckle body assembly at the strain gauge mounting zone, to the strain gauge circuit. The method may include configuring the cable barrier management system to include a management system controller to manage and perform functions or operations to sense, monitor and determine strain received by the strain gauge circuit; determine or identify the occurrence of strain events; generate communications in relation to strain events and status of the cable barrier system and particularly the turnbuckle subsystem; and manage the supplying of electric power to the cable barrier management system and usage of the same. The method may include configuring the strain gauge circuit to receive strain from the turnbuckle body assembly in relation to strain received by the turnbuckle body assembly from the cable joined thereto. The method may include configuring the management system controller, by a sensing circuit, to sense or monitor strain gauge circuit output voltage from the strain gauge circuit in relation to receiving strain from the turnbuckle body assembly. The method may include configuring one of the strain gauge circuit and the sensing circuit to include a transducer to transform transducer strain input to transducer electric voltage output in relation to strain received by the strain gauge circuit from the turnbuckle body assembly in relation to forces exerted on the turnbuckle body assembly by the cable joined thereto. The method may include configuring the management system controller to generate communications in relation to strain events or status of the cable barrier system or turnbuckle subsystem; in relation to sensing, monitoring and determining strain received by the strain gauge circuit; in relation to determining or identifying the occurrence of strain events; and in relation to managing the supplying of electric power to the cable barrier management system and usage of the same. The method may include configuring the management system controller to generate such communications via the wireless data communications interface to a remote recipient wireless device, to initiate maintenance or repair of the cable barrier system or turnbuckle subsystem.

The above-mentioned shortcomings, disadvantages and problems are addressed herein, as may be understood by those skilled in the art upon reading and studying the following specification. This Summary is provided to introduce a selection of concepts in a simplified form that are further described below in more detail in the Detailed Description. This Summary is not intended to identify key or essential features of the claimed subject matter. Unless otherwise defined, all terms (including technical and scientific terms) used herein have the same meaning as commonly understood by one of ordinary skill in the art to which this disclosure belongs. It may be further understood that terms, such as those defined in commonly used dictionaries, should be interpreted as having a meaning that is consistent with their meaning in the context of the relevant art and the present disclosure may not be interpreted in an idealized or overly formal sense.

BRIEF DESCRIPTION OF THE DRAWINGS

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages may become apparent by reference to the associated drawings, detailed description, and claims.

FIG. 10 is a simplified flow diagram illustrating a method for management of a cable barrier system in an embodiment.

Figure 1:
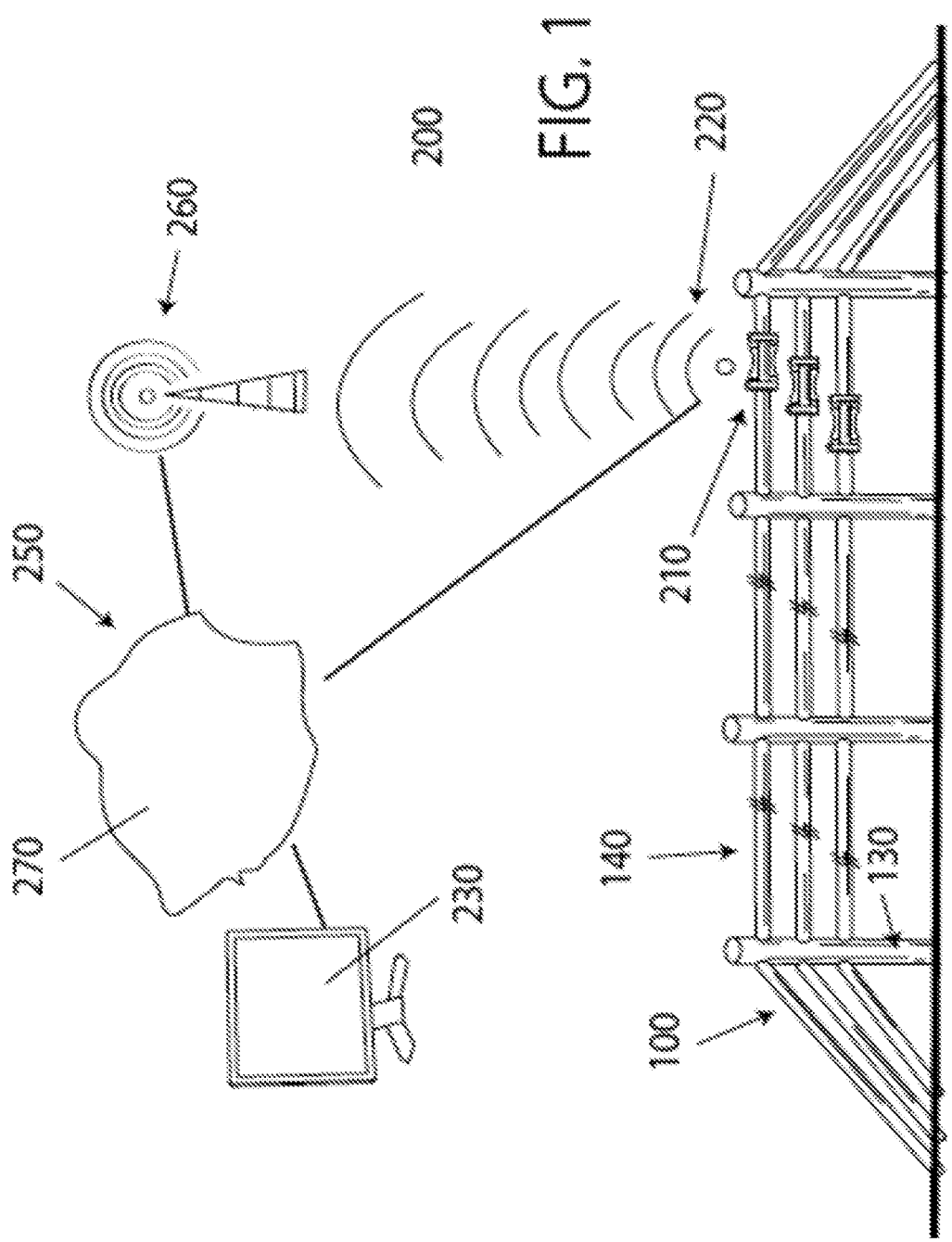
FIG. 1 is a simplified partial schematic view of a cable barrier system configured for operation with a cable barrier management system, in an exemplary embodiment.

The disclosed subject matter itself, as well as further objectives, and advantages thereof, may best be illustrated by reference to the following detailed description of embodiments of the device read in conjunction with the accompanying drawings, wherein: In the following detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

DETAILED DESCRIPTION OF THE INVENTION

The terminology used herein is for the purpose of describing particular embodiments only and is not intended to be limiting. As used herein, the singular forms "a", "an", and "the" are intended to include the plural forms as well, unless the context clearly indicates otherwise. It may be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It may be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it may be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein. The detailed description set forth herein in connection with the appended drawings is intended as a description of exemplary embodiments in which the presently disclosed apparatus and system maybe practiced. The term "exemplary" used throughout this description means "serving as an example, instance, or illustration," and should not necessarily be construed as preferred or advantageous over other embodiments.

FIG. 1 is a simplified partial schematic view of a cable barrier system (CBS) 100 configured for use and operable with a cable barrier management system 200, in an exemplary embodiment. The cable barrier system 100 may include a plurality of support posts 130 installed in the ground and spaced along a stretch of roadway, and a plurality of cables 140 running between the support posts 130 and secured in place with mounting hardware (not shown). The cables 140 may extend generally parallel to the ground in a horizontal orientation. The cables 140 when installed may be pretensioned to minimize dynamic deflection and capture or arrest a vehicle moving relative to the cable barrier system 100. The cable barrier management system 200 may include a plurality of turnbuckle subsystems 210 each joined to a respective cable 140 and adjustable to impart desired pretension into the cable. As shown generally in FIG. 1, the cable barrier management system 200 may include a wireless data communications interface 220 configured to transmit and/or receive wireless communications via a wireless data communications protocol to a remote recipient computing device 230 over a data communications network 250. In an embodiment, the data communications network 250 may include a wireless network 260 such as a mobile phone network, Internet 270, or both.

Figure 2:
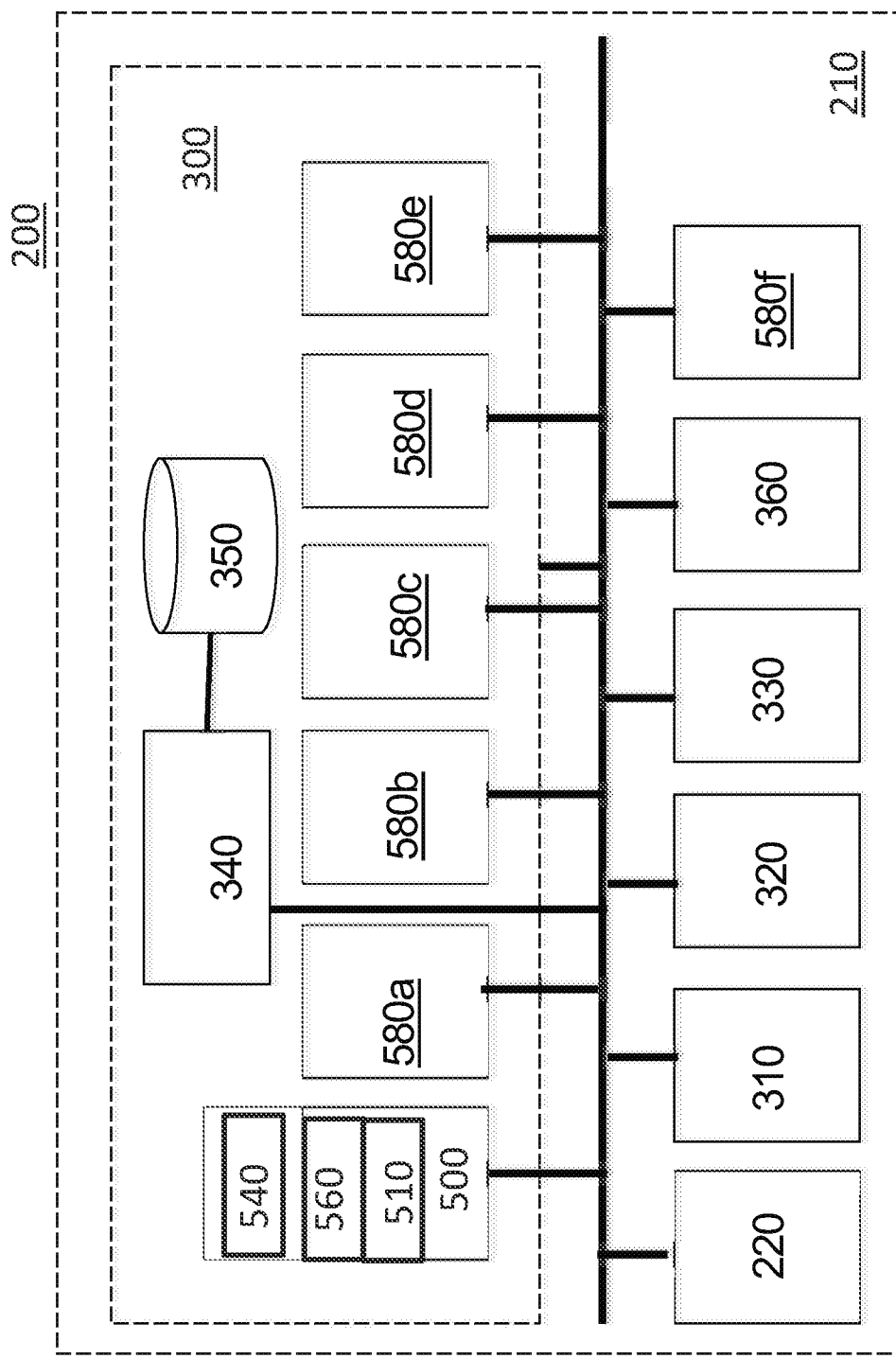
FIG. 2 is a simplified partial block diagram of the cable barrier management system shown generally in FIG. 1.
Figure 3:
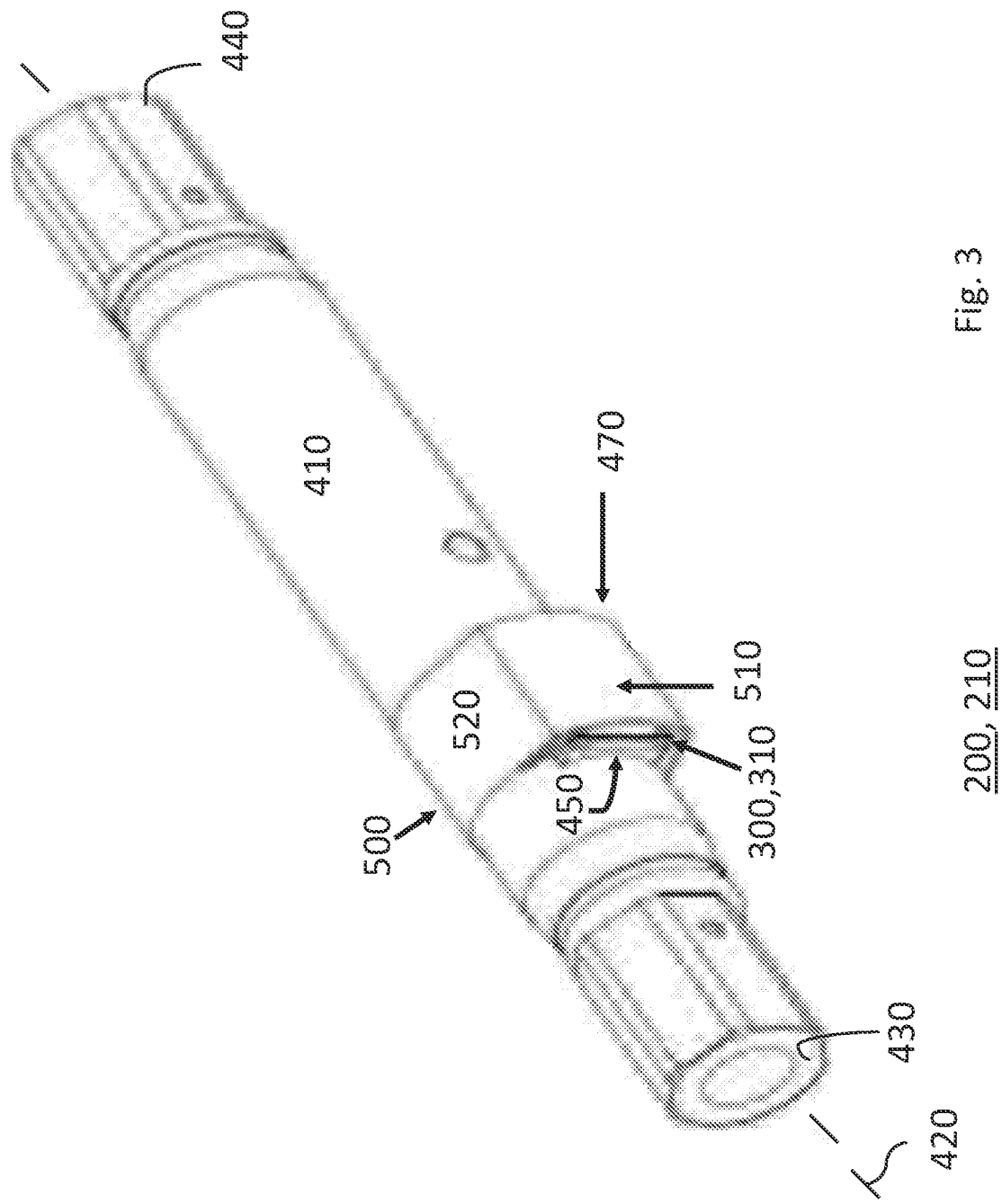
FIG. 3 is a simplified partial perspective view of a turnbuckle subsystem of the cable barrier management system shown generally in FIG. 1.
Figure 4:
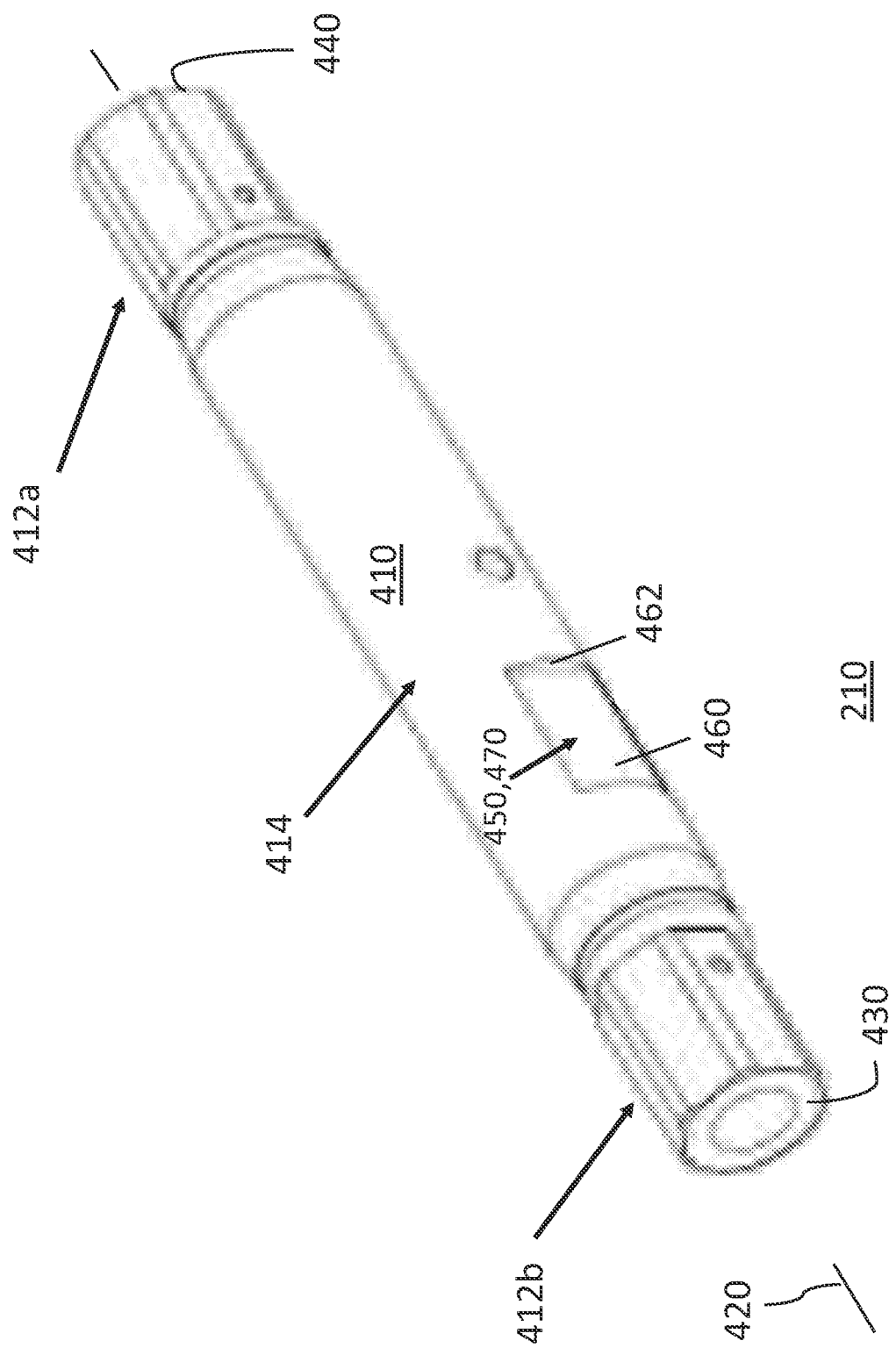
FIG. 4 is a simplified partial perspective view similar to FIG. 3, showing the turnbuckle subsystem, with other structure omitted for clarity.
Figure 5:
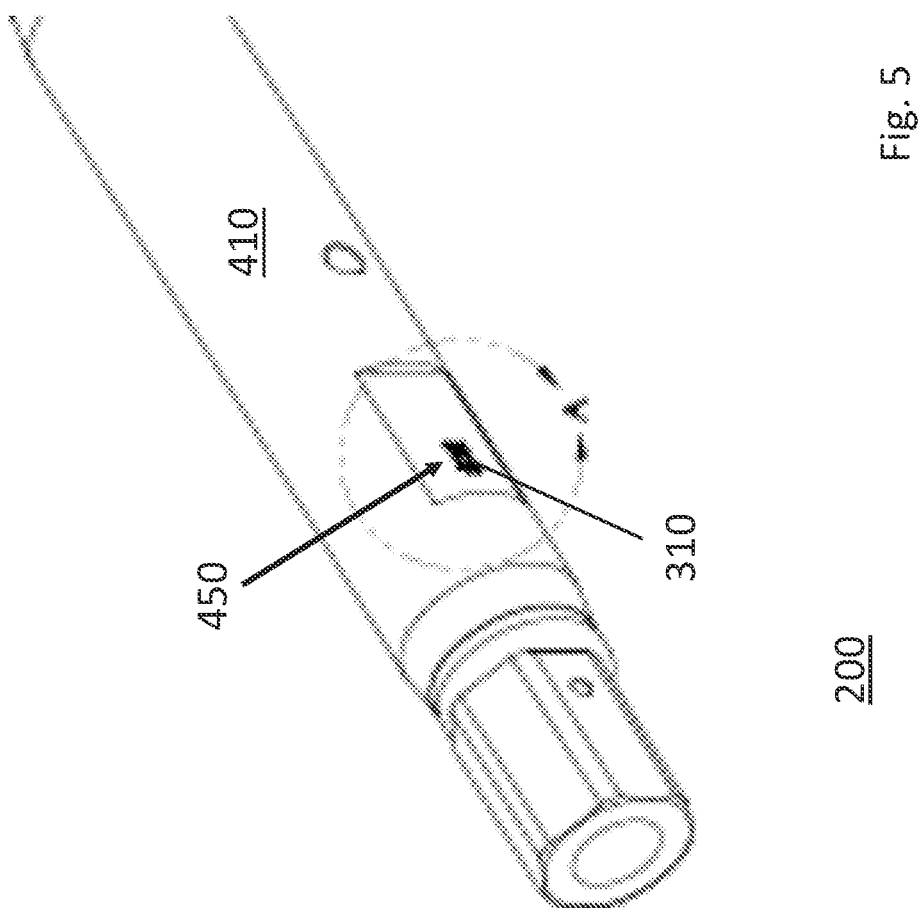
FIG. 5 is a simplified partial perspective view similar to FIG. 3, showing the turnbuckle subsystem and strain gauge circuit, with other structure omitted for clarity.
Figure 6:
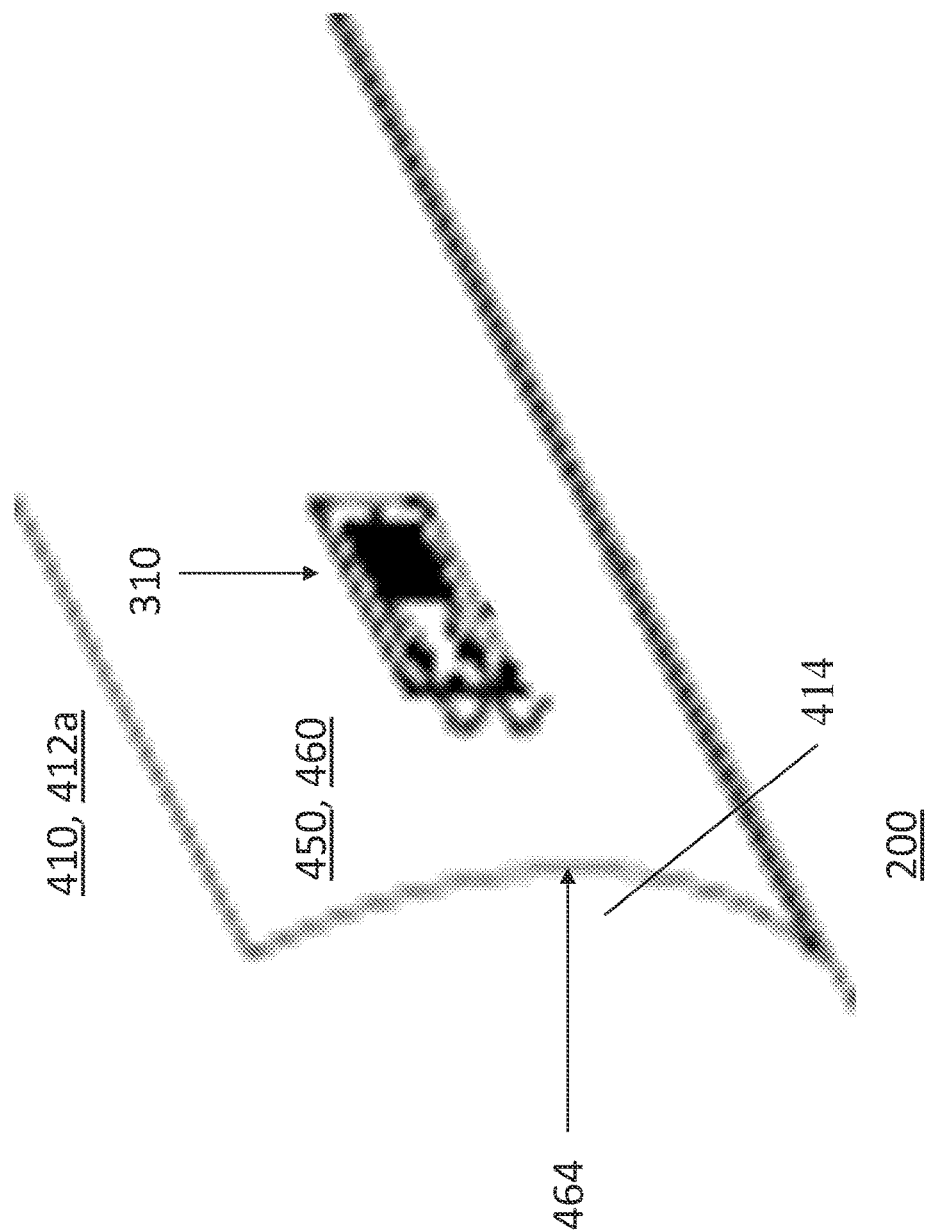
FIG. 6 is an enlarged simplified partial perspective view of the area of interest A shown generally in FIG. 5., showing detail of the strain gauge circuit.
Figure 7:
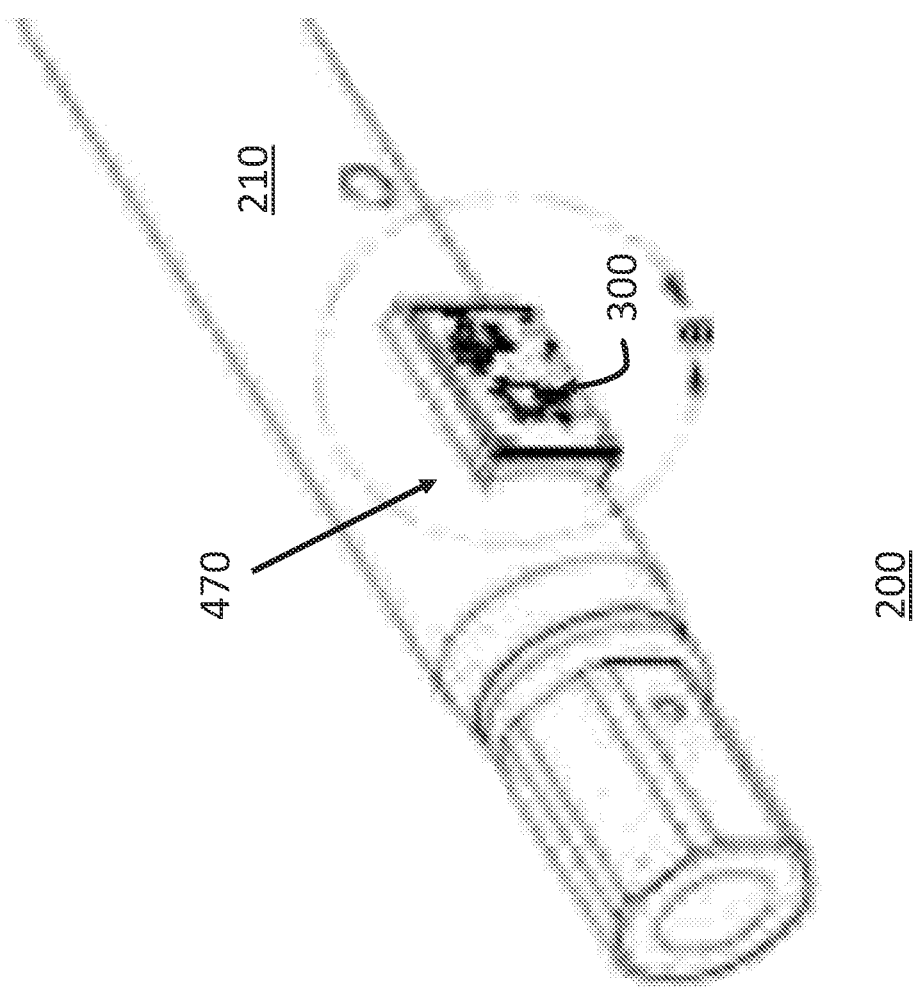
FIG. 7 is a simplified partial perspective view similar to FIG. 3, showing the detail of the cable barrier management system including turnbuckle subsystem, with outer cover and solar panel omitted.
Figure 8:
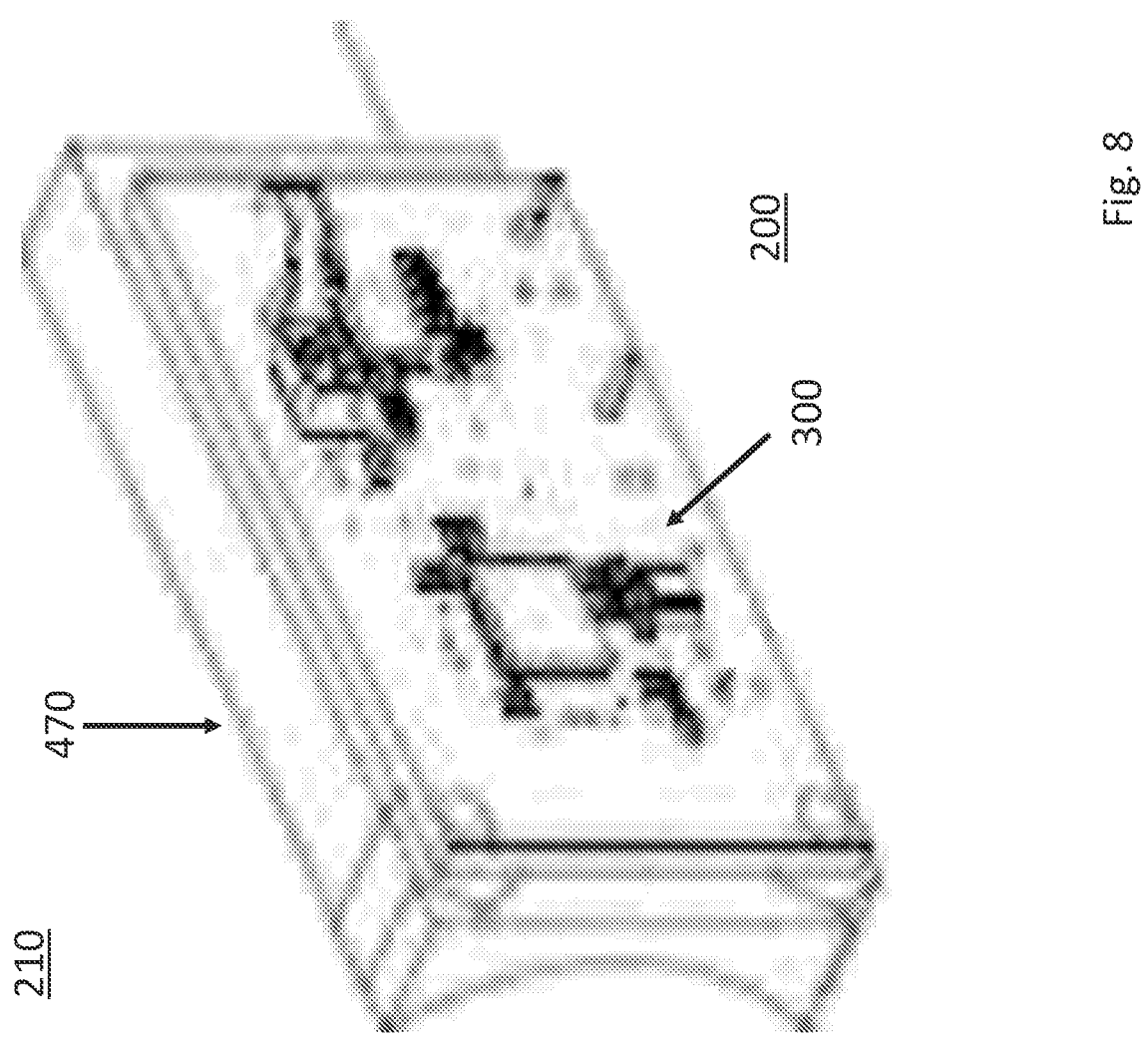
FIG. 8 is an enlarged simplified partial perspective view of the area of interest B shown generally in FIG. 7., showing detail of the cable barrier management system.

FIG. 2 is a simplified partial block diagram of the cable barrier management system 200 configured for use and operable with the cable barrier system 100 shown generally in FIG. 1. Shown in FIG. 3 is a simplified partial perspective view of a turnbuckle subsystem 210 of the cable barrier management system 200, as shown generally in FIG. 1. Turnbuckle subsystem 210 is configured to be joined to a respective cable (cable 140 being shown in FIG. 1) to provide control of pretension and also to enable management of the cable barrier system (100, shown in FIG. 1) by cable barrier management system 200. As shown in FIG. 3, each turnbuckle subsystem 210 may be configured to receive and support a management system controller 300 in electrical communication with the strain gauge circuit. Each of the turnbuckle subsystems 210 may be joined to a cable (cable 140 shown in FIG. 1). Each of the turnbuckle subsystems 210 may include a turnbuckle body assembly 410 joined to the cable (cable 140 shown in FIG. 1). Referring to FIG. 4, the turnbuckle body assembly 410 may include a mating turnbuckle body which may be joined to the cable (cable 140 shown in FIG. 1) in adjustable threaded relationship by a mating set of threads (not shown). The turnbuckle body assembly 410 may be machined from suitable metal stock material, such as steel, or may be a turnbuckle purchased from a vendor and adapted by limited machining to provide the structure described herein. In one embodiment, for example, a suitable commercially available product that may be adapted by limited machining is a Part No. 5826G turnbuckle available from the Highway Safety Division of Trinity Industries Inc. (Dallas, Tex.), and the specification for same is hereby incorporated by reference. The turnbuckle body assembly 410 may include a strain gauge mounting zone 450. The strain gauge mounting zone 450 may include a depression formed in the major outer surface 414 of the turnbuckle body assembly 410, such as by machining. The depression may have a flat bottom defined by a flat surface 460 formed in the turnbuckle body 410. The depression may include a pair of opposed, parallel minor end walls 462 (one of the minor end walls 462 being visible in FIG. 4) intersecting the flat surface 460. Each of the minor end walls 462 may extend perpendicular to the major longitudinal axis 420 of the turnbuckle body assembly 410, between a corresponding edge of the flat surface 460 and a curved outside edge 464 (best shown in FIG. 6) formed along an intersection with the major outer surface 414 of the turnbuckle body assembly 410. The depression may have an open volume between the pair of end walls and flat surface 460 forming the bottom. Flat surface 460 may extend in parallel relationship to the longitudinal axis 420 of the turnbuckle body assembly 410 to enable mounting the strain gauge circuit 310 in an orientation to receive strain from forces exerted on the turnbuckle body assembly 410 from the pretensioned cable (cable 140 shown in FIG. 1). The turnbuckle body assembly 410 may include a system controller mounting zone 470. The system controller mounting zone 470 (shown in FIG. 4) may be an extension or enlargement of the flat surface 460 formed in turnbuckle body assembly 410, which enables mounting and support of the management system controller 300 in electric circuit communication with the strain gauge circuit 310 to receive strain gauge output voltage from the strain gauge circuit 310 in relation to forces received by the strain gauge circuit 310 from the turnbuckle body assembly 410. For clarity, the flat surface 460 may be enlarged to receive and support both the strain gauge circuit 310 and management system controller 300.

In an embodiment as shown in FIG. 3, the cable barrier management system 200 may include the turnbuckle subsystem 210. Turnbuckle subsystem 210 may include strain gauge circuit 310 mounted to the turnbuckle body assembly 410 at the strain gauge mounting zone 450, which may include flat surface 460 (strain gauge mounting zone 450 and flat surface 460 being shown in FIG. 4), for the strain gauge circuit 310 to receive strain from the turnbuckle body assembly 410 in relation to strain generated in the turnbuckle body assembly 410 under load exerted by the pretensioned cable (cable 140 shown in FIG. 1).

As shown in FIG. 2, the cable barrier management system 200 may include the turnbuckle subsystem 210 including the management system controller 300. Management system controller 300 may include a sensing circuit 320 in electric voltage communication with the strain gauge circuit 310 to pass voltage in relation to strain received by the strain gauge circuit 310. In an embodiment, the sensing circuit 320 may interface with a transducer interface 330 configured to produce transducer output voltage, in relation to strain received by the strain gauge circuit 310. The management system controller 300 may include a management processor 340 in communication with data storage 350. Management processor 340 may be configured to receive the sensing circuit output voltage, which may include transducer output voltage from a transducer interface 330 interfacing with sensing circuit 320, in relation to strain received by the strain gauge circuit 310. In an embodiment as shown in FIG. 2, the sensing circuit 320 may interface with a transducer interface 330, such that the sensing circuit output voltage may relate to transducer output voltage from the transducer interface 330, in relation to strain received by the strain gauge circuit 310. As shown in FIG. 2, the management processor 340 may be configured to determine, by receiving the sensing circuit output voltage, a level of strain received by the strain gauge circuit 310 in relation to a threshold level. In an embodiment, the sensing circuit 320 may be configured to operate in a low power mode, wherein the strain gauge circuit 310 is periodically quantified by the management processor 340 in communication with the sensing circuit 320 and receiving the sensing circuit output in relation to strain received by the strain gauge circuit 310, and wherein the management processor 340 may send periodic communications of cable barrier management system status information via the wireless data communication interface 220, with the periodic communications being limited to conserve energy. In an embodiment, the sensing circuit 320 may be configured to operate in an ultra-low power mode, wherein the strain gauge circuit output is monitored and compared to an actuation level that triggers the management processor 340 to wake and operate in the low power mode or in an active, high power mode, and may eliminate monitoring and filtering of the strain gauge circuit output by the processor 340.

In an embodiment as shown in FIG. 2, the management system controller 300 may include a cable barrier analysis module 360 configured to determine collision events and status or health of the cable barrier in relation to strain received by the strain gauge circuit 310. In an embodiment, the management processor 340 may be configured to perform steps of the cable barrier analysis module 360 to determine collision events in relation to strain gauge circuit output and further in relation to strain received by the strain gauge circuit 310. The cable barrier analysis module 360 may be configured to determine or identify vehicle to barrier collision events in which a vehicle has collided with the cable barrier system 100 (shown in FIG. 1) that includes the cable barrier management system 200. When a vehicle to barrier collision event occurs between a vehicle and the cable barrier system 100 (shown in FIG. 1), an impulse of extraordinary or excess strain will be imparted to and received by the cable barrier management system 200. Referring to FIG. 2, the strain gauge circuit 310 may output strain gauge circuit output for an excess strain event. The strain gauge circuit output may include extraordinary or excess strain responsive voltage such as, for example, a large change in the strain gauge circuit output, rapid change in the strain gauge circuit output, or both. As used here, "extraordinary strain" means strain produced by a vehicle to barrier strain event and received by the strain gauge circuit 310, that exceeds the range of strain received by the cable barrier management system 200 in regular functioning of the barrier system 100 without a vehicle to barrier collision event. In an embodiment, the strain gauge circuit output may be an electrical signal output from the strain gauge circuit 310 in relation to converting strain force to electric voltage output. As shown in FIG. 2, strain gauge circuit output may be monitored by the management processor 340 implementing cable barrier analysis module 360 to identify and distinguish between extraordinary or excess strain events associated with a vehicle to barrier collision, and regular, non-collision functioning of the cable barrier system 100. Similarly, the cable barrier analysis module 360 also may be configured to determine or identify cable under-tension failure events in which a cable exhibits failure of the pretension by being under-tensioned, with insufficient strain or less than ordinary strain, or no strain, being received by the turnbuckle body assembly 410 and strain gauge circuit 310. In some instances, for example, cable pretension failure with insufficient strain received by the strain gauge circuit 310 may be preceded by extraordinary or excess strain being received by the strain gauge circuit due to a vehicle to barrier collision event causing failure of cable pretension. When a vehicle to barrier collision event occurs between a vehicle and the cable barrier system 100 (shown in FIG. 1), an impulse of extraordinary or excess strain will be imparted to and received by the cable barrier management system 200, such that the strain gauge circuit 310 may output strain gauge circuit output for an excess strain event. In an embodiment as shown in FIG. 2, when the management processor 340 determines that a strain event has occurred, the management processor 340 or a management microcontroller including the management processor, may exit the low power mode and perform additional processing of strain gauge circuit output, which may include receiving and processing additional measurements of strain gauge circuit output. This additional processing of strain gauge circuit output by the management processor 340 may improve precision of measurements of actual strain received by the strain gauge circuit 310. Additional processing of strain gauge circuit output also may improve accuracy of analytical processing or analysis of the strain gauge circuit output in determining whether a strain event detected or identified in the strain gauge circuit output is caused by a vehicle to barrier collision event. If the detected strain event is a vehicle to barrier collision event, the management processor 340 may output a notification message and cause the same to be transmitted to a remote recipient computing device 230 via the wireless data communications interface 220 over a wireless data communication network 250 (shown in FIG. 1), such as a radio frequency (RF) subsystem. The notification message when transmitted may be received by remote recipient computing devices 230 remote from the location of the cable barrier system 200. In an embodiment, the management processor 340 and wireless data communications interface 220 may be configured to transmit and/or re-transmit information relating to the status of the cable barrier management system 200, barrier system 100, or both, at an increased rate of communications. In an embodiment, the management processor 340 may be configured to provide a historical event status message, subsequent to the strain event, indicating that a vehicle to barrier collision event has occurred, indicating that a cable pretension failure event has occurred, or both, in a history of the cable barrier management system 200 and barrier system 100.

In an embodiment as shown in FIG. 2, the cable barrier management system 200 may include a power supply system 500. The management processor 340 may be configured to manage the power supply system 500. The power supply system 500 may be configured to supply electric power to circuits of the cable barrier management system 200 for operating same. The power supply system 500 may be configured to develop the electric power for operating the cable barrier management system 200. The power supply system 500 thus may include a solar or photovoltaic (PV) element ("photovoltaic element") 510 (shown in FIG. 3) or array of same, configured to receive solar energy and output electric voltage. The power supply system 500 may include a power supply mounting structure 520 (shown in FIG. 3) configured to support the photovoltaic element 510 in relation to the turnbuckle body assembly 410. Referring to FIG. 2, the power supply system 500 may include a rechargeable battery 540 configured to be charged by operation of the photovoltaic element 510. The power supply system 500 may include a battery management subsystem 560 configured to monitor and manage charging of the rechargeable battery 540 in relation to instructions received from the management processor 340. As shown in FIG. 2, the cable barrier management system 200 may include a plurality of function modules 580a, 580b, 580c, 580d, 580e and 580f configured to perform a plurality of predetermined system functions implemented by management processor 340.

Figure 9:
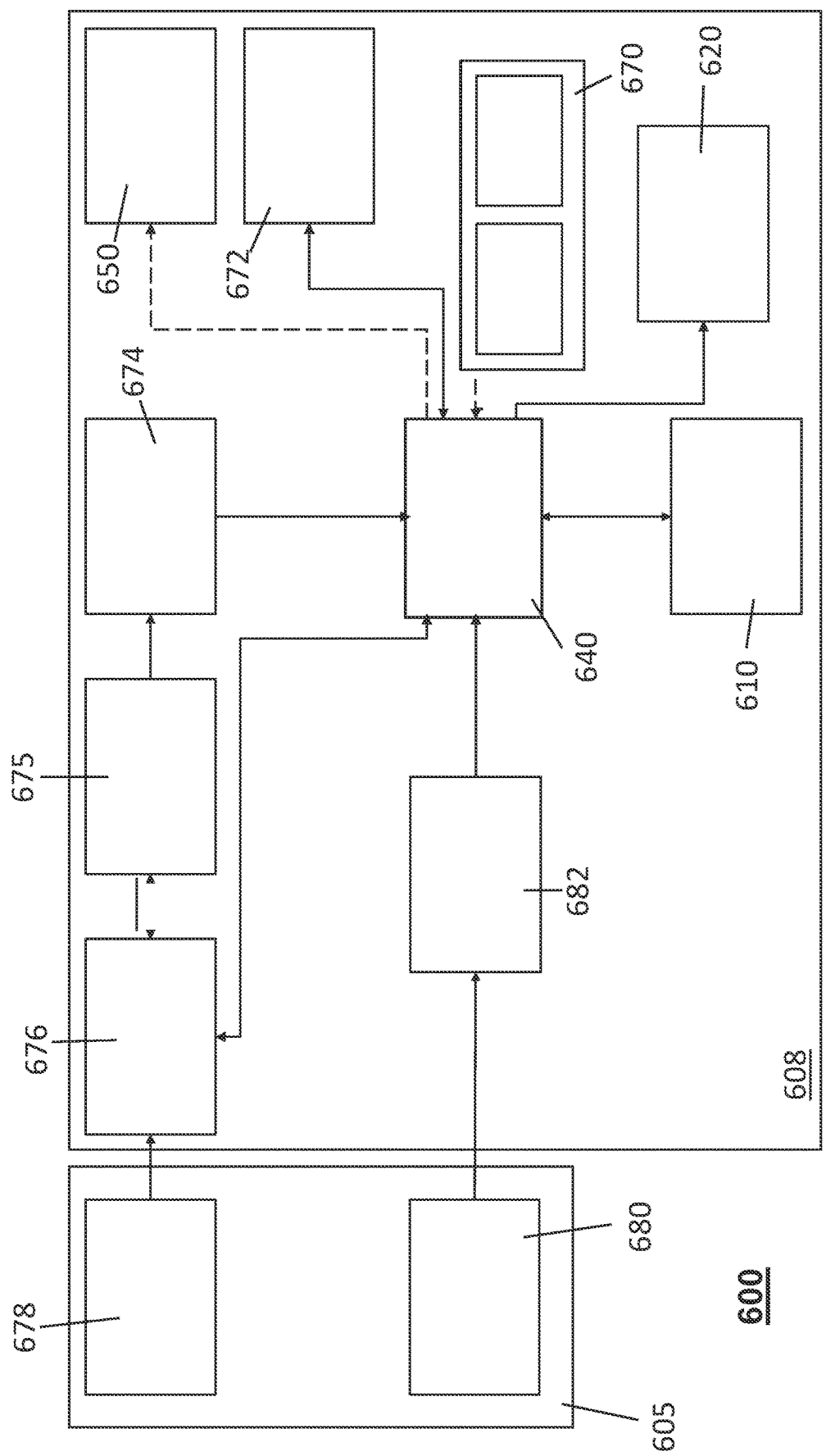
FIG. 9 is a simplified schematic illustration similar to FIG. 2, showing aspects of the cable barrier management system in an embodiment.

In an embodiment as shown in FIG. 9, a cable barrier management system 600 may be configured to manage a cable barrier system. Except where described or illustrated differently, cable barrier management system 600 may be identical to cable barrier management system 200, which is elsewhere described herein and illustrated in FIGS. 1-8. Cable barrier management system 600 may include a management processor 640 which may be configured for communication with data storage 610 to record cable barrier management system data into the data storage 610. In an embodiment, such data storage 610 may be a non-volatile storage medium. Cable barrier management system 600 may include turnbuckle subsystem 605. Turnbuckle subsystem 605 may include strain gauge 680 and photovoltaic element 678. Cable barrier management system 600 may include management system controller 608 in communication with function modules and operable to implement the functions of same. The management processor 640 may be configured to cause operation of indicator electronics 620 (shown in FIG. 9) which may present a visual indication of status of a cable barrier system being managed. The management processor 640 may be configured to implement a GPS data module 650 configured to output GPS data for the cable barrier management system 600 and cable barrier system being managed. In an embodiment, the management processor 640 may be configured to implement a sensor data module 670 configured to receive and output environmental sensor data such as, for example, atmospheric relative humidity, pressure and temperature data for the cable barrier management system. Cable barrier management system 600 may include wireless communications interface 672 in communication with management processor 640. Wireless communications interface 672 may be, for example, an RF communications transceiver. Cable barrier management system 600 may include power supply 674 in communication with battery 675 and management processor 640. Cable barrier management system 600 may include battery charging and monitoring subsystem 676 in communication with photovoltaic element 678 and battery 675. Cable barrier management system 600 may include transducer interface 682 in communication with strain gauge 680 and management processor 640.

As shown in FIG. 2, in an embodiment, the cable barrier management system 200 may include a wireless data communications interface 220 configured to implement wireless data communications according to a communications protocol. The wireless data communications interface 220 may be enabled and operate responsive to and under control of the management processor 340. In an embodiment, such a wireless data communications interface 220 may be a radio frequency (RF) communications interface configured for communicating data over a wireless communications network 250 according to a suitable data communications protocol, to a remote recipient computing device 230, such as a wireless recipient computing device which is remote from the cable barrier system 100 and portion of the cable barrier management system 200 co-located with the cable barrier system 100. Such a data communications network may be, for example, a cellular data network or other wireless network and may include the Internet. In an embodiment, the cable barrier management system 200 may monitor the functional status or health of the cable barrier system 100. If the cable barrier system 100 does not meet minimum tension requirements for operation, the cable barrier management system 200 may output an automatic notice message to a remote recipient computing device 230 of a designated monitoring authority. Maintenance of the cable barrier system 100 may be scheduled, dispatched and performed in relation to such automatic notice messages.

In an embodiment, the management processor 340 of the cable barrier management system 200 may be configured to detect, transmit and provide monitoring information to a remote recipient computing device 230, where damage to the cable barrier system 100 has occurred, such as by a vehicle to barrier impact event. For example, high energy impact events, such as a vehicle directly striking a turnbuckle subsystem 210 in a manner that damages or destroys the portions, such as circuits, of the cable barrier management system 200 located at or mounted on the turnbuckle subsystem 210. In an embodiment, where a strain event is detected, the management processor 340 may output a status update message including a preliminary flag, and may cause the same to be transmitted via the wireless data communications interface 220 to the remote recipient computing device 230, with only partial or incomplete filtering or processing of the strain event data. The preliminary flag may be recorded when received by the remote recipient computing device 230. Where a preliminary flag is recorded, the management processor 340 may determine whether subsequent communications are received from the same cable barrier management system 200. The management processor 340 of the cable barrier management system 200 may query and perform a status check of the cable barrier system 100. In an embodiment, the cable barrier management system 200 may be configured for the management processor 340 to enter a high-power state where processing occurs at a higher rate and attempts to determine if a vehicle to barrier collision event has occurred, without unnecessary delay. The management processor 340 may be configured to output and transmit an impact message to a remote recipient computing device 230 before damage to the cable barrier management system 200 prevents such output and transmission of the impact message. In an embodiment, the cable barrier management system 200 may be configured to determine the destruction or other non-functioning status of portions of the cable barrier management system 200, such as portions located at or in proximity to the turnbuckle subsystem 210, by detecting or determining where periodic status messages are absent and not received by a remote recipient computing device 230.

In an embodiment as shown in FIG. 1, the cable barrier management system 200 may be configured to enable unique identification of a turnbuckle subsystem 210, and location of same such as by GPS location, in relation to specific configuration information relating to a portion of the cable barrier management system 200 located at or in immediate proximity to the turnbuckle subsystem 210, with minimal consumption of power by GPS electronics.

In an embodiment illustrated in FIG. 10, an exemplary method 700 for managing a cable barrier system is provided. The method 700 for managing a cable barrier system may include first configuring 704 a cable barrier management system. The method 700 may include second configuring 708 the cable barrier management system to include a turnbuckle subsystem joined to a cable for adjusting and exerting a pretension force on the cable. The method 700 may include third configuring 712 the turnbuckle subsystem to include a turnbuckle body assembly joined to the cable for adjusting and exerting pretension force on the cable. The method 700 may include fourth configuring 716 the turnbuckle body assembly at a strain gauge mounting zone to support a strain gauge circuit, and to output strain from the turnbuckle body assembly at the strain gauge mounting zone, to the strain gauge circuit. The method 700 may include fifth configuring 720 the management system controller to manage and perform functions or operations to monitor or sense monitor strain received by the strain gauge circuit. The method 700 may include sixth configuring 724 the management system controller to perform analysis to determine or identify the occurrence of strain events, which may include extraordinary or excess strain events and insufficient strain or pretension failure events. The method 700 may include seventh configuring 728 the management system controller to generate data communications via a wireless data communication interface to a remote recipient computing device in relation to strain events and status of the cable barrier system, such as the turnbuckle subsystem. The method 700 may include eighth configuring 732 the management system controller to manage the supplying of electric power for operating the cable barrier management system by a power supply system, charging and discharging of a rechargeable battery via a battery management subsystem, and usage of power by circuits of the cable barrier management system. The method 700 may include ninth configuring 736 the strain gauge circuit to receive strain from the turnbuckle body assembly in relation to strain received by the turnbuckle body assembly from the cable joined thereto. The method 700 may include tenth configuring 740 the management system controller, by a sensing circuit, to sense or monitor strain gauge circuit output voltage from the strain gauge circuit in relation to receiving strain from the turnbuckle body assembly. The method 700 may include eleventh configuring 744 one of the strain gauge circuit and the sensing circuit including a transducer interface, to transform transducer strain input to transducer electric voltage output in relation to strain received by the strain gauge circuit from the turnbuckle body assembly in relation to forces exerted on the turnbuckle body assembly by the cable joined thereto. The method 700 may include twelfth configuring 748 the management system controller to generate data communications via the wireless data communications interface to a remote recipient wireless device, to provide notice communications to initiate maintenance or repair of the cable barrier system or turnbuckle subsystem. Method 700 may include sensing 752, by a sensing circuit, strain received by the strain gauge circuit from the turnbuckle body assembly to produce sensing circuit output. Method 700 may include converting 756, by a transducer interface, strain received by the strain gauge circuit to electric voltage output. Method 700 may include providing 760 sensing circuit output to the system management controller for monitoring the sensing circuit output. Method 700 may include first analyzing 760, by the system management controller, sensing circuit output to determine excess strain events. Method 700 may include first identifying 764, by the management processor, excess strain events as being associated with vehicle to barrier system collision events. Method 700 may include second analyzing 768, by the system management controller, sensing circuit output to determine insufficient strain events. Method 700 may include second identifying 772, by the management processor, insufficient strain events as being associated with cable pretension failures. Method 700 may include low power operating 776, by the management processor, responsive to strain received by the strain gauge circuit falling within normal range for the cable barrier system in the absence of deviations out of the range of strain values measured for the strain gauge circuit where the cable barrier is operating in the normal mode. Method 700 may include high power operating 780, by the management processor, responsive to strain received by the strain gauge circuit exceeding and deviating from the normal range where the cable barrier is not operating in the normal mode and where strain received by the strain gauge circuit exceeded the normal range. Method 700 may include event analyzing 784, by the management processor, sensing circuit output in relation to force received by the strain gauge circuit to determine or identify excess strain deviations from the normal strain range or insufficient strain deviations from the normal strain range when the barrier system is functioning in a normal manner without vehicle to barrier collision events or cable pretension failures. Method 700 may include increased measuring 788, by the management processor, of sensing circuit output where excess strain deviations or insufficient strain deviations are determined. Method 700 may include messaging 790, by the management processor, of message information via a wireless data communications interface over a data communication network to a remote recipient computing device. Method 700 may include increased messaging 792, by the management processor, of message information via the wireless data communications interface over the data communication network to the remote recipient computing device, where excess strain deviations or insufficient strain deviations are determined. Method 700 may include excess threshold comparing 794 of possible excess strain deviations to a minimum strain threshold for excess strain events, such as vehicle to barrier collision events. Method 700 may include insufficient threshold comparing 796 of possible insufficient strain deviations to a maximum strain threshold for insufficient strain events. Method 700 may include locating 798 the cable barrier management system, such as by mapping or associating system configuration information with a geographic location or GPS coordinates. Method 700 may include power managing 802, by the management processor, to provide power for operating the cable barrier management system, to charge the rechargeable battery via the battery management subsystem, or both. Method 700 may include flag transmitting 806 a preliminary flag where strain deviates from a range or threshold. Method 700 may be disruption identifying 810, by the management processor, where communications are not received or transmitted. Method 700 may include sensor receiving 814, by the management processor, from an environmental sensor associated with the cable barrier management system.

Apparatus, methods and systems according to embodiments of the disclosure are described. Although specific embodiments are illustrated and described herein, it may be appreciated by those of ordinary skill in the art that any arrangement which is calculated to achieve the same purposes maybe substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art may appreciate that implementations maybe made for other fields of art, systems, apparatus or methods that provide the required functions. The invention should therefore not be limited by the above described embodiment, method, and examples, but by all embodiments and methods within the scope and spirit of the invention.

One of ordinary skill in the art may readily appreciate that the names of the methods and apparatus are not intended to limit embodiments or the disclosure. Furthermore, additional methods, steps, and apparatus maybe added to the components, functions maybe rearranged among the components, and new components to correspond to future enhancements and physical devices used in embodiments maybe introduced without departing from the scope of embodiments and the disclosure. One of skill in the art may readily recognize that embodiments are applicable to future systems, future apparatus, future methods, and different materials. All methods described herein may be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. A system comprising:
    a cable barrier management system configured to manage a cable barrier system, the cable barrier system comprising a plurality of barrier cables running between a plurality of barrier support posts located along a roadway;
    said cable barrier management system comprising a management system controller, said management system controller comprising:
        a management processor operable to execute processor-executable instructions;
        a wireless data communications interface configured to transmit, responsive to the management system controller, wireless communications to a remote recipient computing device over a data communications network;
        a plurality of turnbuckle subsystems each configured to be joined to a respective one of the plurality of barrier cables to provide pretension, each of the plurality of turnbuckle subsystems configured to enable communication of strain from a turnbuckle body assembly to a strain gauge circuit, to the management processor;
        the turnbuckle body assembly comprising a strain gauge mounting zone comprising a flat surface formed in the turnbuckle body assembly, the strain gauge mounting zone configured to support a strain gauge circuit to receive strain from the turnbuckle body assembly in relation to tensile forces exerted in a longitudinal direction by a cable joined to the turnbuckle body assembly at an end thereof;
        the turnbuckle body assembly comprising a system controller mounting zone configured to support the management system controller in electric circuit communication with the strain gauge circuit to receive strain gauge output voltage from the strain gauge circuit in relation to strain received by the strain gauge circuit from the turnbuckle body assembly; the management system controller comprising a sensing circuit configured to receive the strain gauge output voltage from the strain gauge circuit, the sensing circuit configured to output sensing circuit output to the management processor;
        the management system controller comprising a cable barrier analysis module configured to determine excess strain events;
        the management processor configured to generate strain event data; and the management processor configured to send strain event data communications via the wireless data communications interface to a remote recipient computing device.

2. The system of claim 1, comprising:
the sensing circuit comprising a transducer interface configured to receive strain gauge circuit output voltage, the transducer interface configured to produce transducer output voltage in relation to the strain gauge circuit output voltage.

3. The system of claim 1, comprising:
the cable barrier analysis module configured to determine vehicle to barrier collision events associated with excess strain events.

4. The system of claim 1, comprising:
the management system controller comprising the cable barrier analysis module configured to determine insufficient strain events.

5. The system of claim 4, comprising:
the cable barrier analysis module configured to determine cable pretension failure events associated with insufficient strain events.

6. The system of claim 1, comprising:
the management processor configured to determine, by receiving the sensing circuit output voltage, a level of strain received by the strain gauge circuit in relation to a threshold level of strain.

7. The system of claim 1, comprising:
the sensing circuit configured to operate in a low power mode, wherein the strain gauge circuit is periodically quantified by the management processor in communication with the sensing circuit to receive the sensing circuit output in relation to strain received by the strain gauge circuit;
the management processor configured to send periodic communications of cable barrier management system status information via the wireless data communication interface.

8. The system of claim 1, comprising:
the sensing circuit configured to operate in an ultra-low power mode,
the management processor waking to operate in one of a low power mode and a high power mode, the management processor in the high power mode active to filter strain gauge circuit output.

9. The system of claim 1, comprising:
a power supply system configured to supply electric power for operating the cable barrier management system.

10. The system of claim 9, comprising:
the power supply system comprising a photovoltaic element configured to develop the electric power for operating the cable barrier management system;
the power supply system comprising a rechargeable battery configured to be charged by operation of the photovoltaic element;
the power supply system comprising a battery management subsystem configured to manage charging of the rechargeable battery.

11. The system of claim 1, comprising:
the management processor configured to implement a GPS data module to output GPS data for the geographic location of the cable barrier management system.

12. The system of claim 1, comprising:
the management processor configured to implement a sensor data module to receive environmental sensor data.

13. The system of claim 1, comprising:
the management processor configured to output a status update message including a preliminary flag transmitted via the wireless data communications interface before damage prevents transmission of same;
one of the management processor and remote recipient computing device configured to perform a status check of the cable barrier system following transmission of the preliminary flag.

14. The system of claim 1, comprising:
the management processor configured to enter a high-power state wherein high-speed processing is performed to determine whether a vehicle to barrier collision event has occurred, with delay minimized.

15. The system of claim 1, comprising:
the management processor configured to determine non-functioning status of a portion of the cable barrier management system in relation to disruption of a periodic status message to be received by a remote recipient computing device.

16. The system of claim 1, further comprising:
the cable barrier system configured to be managed by the cable barrier management system, the cable barrier system comprising a plurality of support posts installed in the ground and a plurality of pretensioned cables running between the support posts, the cables supported by mounting hardware comprising a turnbuckle subsystem configured to function with the management system controller.

* * * * *